Patented Jan. 6, 1953

2,624,681

UNITED STATES PATENT OFFICE 2,624,681

ENVELOPE SEAM GUM AND A METHOD OF PREPARING IT

Julius Rapp, Forest Hills, N. Y., assignor to Stein, Hall & Company, Inc., New York, N. Y., a corporation of New York No Drawing. Application September 21, 1949, Serial No. 117,061

12 Claims. (Cl. 106—210)

The present invention relates to an envelope seam gum and to a method of preparing the same.

An adhesive used for the sealing of the back seams of envelopes must meet a particular set of specifications that differ from the requirements of other adhesives such as, for example, seal gums which are used for the gumming of the flaps or seals of envelopes. A good envelope seam gum must have good machining properties, i. e., it must not "cotton" or "sugar," the adhering seams must not wrinkle, the adhesive must of course have good bonding properties, be non-staining and stable in both the wet and dry forms and not crystallize after application.

It has been proposed heretofore to produce envelope seam gums containing as their essential components a starch component and either sugar or urea as a plasticizer therefor.

When sugar and low soluble starches or starch products are cooked together, the sugar, in addition to its plasticizing effect, has the effect of inhibiting the gelatinization by raising the gelatinization temperature of the starch particles. Consequently, continued cooking at 180° to 190° F. does not appreciably swell the starch particles. This in turn gives the resulting gum relatively little adhesive power and, if initial dry adhesive strength does exist, after a period of time the adhesive film will crystallize and result in loss of adhesion.

Gums containing acid in addition to sugar and a starch component have been proposed with a view to avoiding crystallization. The acid, however, inverts the sugar and the inverted sugar reacts with sized or protein containing papers, such as bond paper, and thereby tends to turn brown and forms a discolored seam.

Urea, in addition to its plasticizing effect, has a tendency to accelerate or promote the gelatinization by reducing the gelatinization temperature of starch. Gums containing starch and urea, therefore, are free from some of the disadvantages of sugar plasticized gums. Unless critical conditions are observed during their preparation, urea plasticized gums have poor wet stability, tend to "cotton" on the machine and, like the sugar plasticized gums, have a tendency to darken and stain the seams on aging.

It has now been found that a gum prepared from modified starch plasticized with at least two component plasticizers, one being a starch gelatinization promoter and another being a starch gelatinization inhibiter is far superior, as an envelope seam gum, to those hitherto proposed or in use. By the use of both urea and a non-reducing sugar, for example, excellent control can be maintained over the gelatinization temperature of the starch component apparently due to the fact that urea has gelatinization promoting properties and sugar has gelatinization inhibiting properties. In accordance with the invention, the pH is maintained within a predetermined range and it is preferable, to insure long term stability against staining, to include a buffering system so as to maintain the initial pH substantially constant. It is also within the contemplation of the invention to include minor proportions of a bleaching agent and, if desired, of an anti-foaming agent.

The particular modified starch required for the purposes of this invention has a content of water solubles in the range of about 0 to 30% by weight and a mixture of from about 15 to about 35 grams thereof with 100 cc. of water brought up to a temperature of 85° C. (185° F.) is of such a viscosity that 50 cc. thereof at 85° C. will flow through an orifice in a standard pipette in a period of time in the range of 35–40 seconds. The orifice in this standard pipette delivers 50 cc. of water at 25° C. in 11 seconds.

A preferred method of preparing such a modified starch is by a wet modification which involves treating an aqueous starch suspension of about 36% solids with a hypochlorite solution having 6–8% active chlorine and containing a slight excess of alkali. The hypochlorite solution is added in small portions so that the heat generated can be dissipated by a cooling system and the temperature maintained between 90° and 125° F. When a product of the desired fluidity is obtained, the oxidation is stopped by adding an antichlor such as sodium bisulfite and the slurry is neutralized, filtered, washed and dried.

Another method of preparing a suitable modified starch is by the wet modification of starch suspended in dilute sulfuric acid (0.1 to 0.2 N) by heating it at about 50° to 55° C. until the paste viscosity is in the desired range. It is then neutralized, filtered, washed and dried.

Still another method of preparing such a modified starch is by the dry modification thereof by adding thereto about 0.03 to about 0.04% hydrochloric acid in the form of an about 16% aqueous solution. This mixture is roasted at a relatively low temperature in the range of 250° to 400° F. until the solubles content thereof, in distilled water at 25° C., is in the desired range, e. g., about 3–5% by weight; and until its gram viscosity is in the desired range, e. g., about 25–27 grams.

Other methods that result in modified starches having viscosities and solubilities within the ranges specified may also be employed. It is also within the contemplation of this invention to utilize combinations of modified starches and starch products exhibiting viscosities and solubilities within the ranges specified.

Plasticizers known to the trade and used in accordance with the present invention as starch gelatinizing promoters include urea, calcium nitrate and sodium nitrate as well as combinations thereof. Plasticizers known to the trade and used in accordance with the present invention as as starch gelatinizing inhibitors include nonreducing sugars, alkane polyols ranging from diols, such as ethylene glycol to hexitols such as sorbitol, high soluble dextrins having a solubility of 70% or more, materials such as sodium acetate and sodium chloride, and combinations thereof. It is to be understood that when more than about 10% by weight of liquid plasticizers, based on the dry weight of the composition, is used, the product, as a practical matter, will be in a liquid or paste form.

It is preferred, in accordance with the invention, that the modified starch product be present in amounts ranging between about 20 to 65 parts by weight and that the proportion of total plasticizers be between approximately 80 and 35 parts by weight. Furthermore, it is desirable that the ratio of starch gelatinization promoting plasticizer to starch gelatinization inhibiting plasticizer be maintained between about 1:1 to 1:4. It is essential also that the pH of the composition be between about 4.5 and 8.5, preferably between about 5.7 and 7.8. Optimum results are obtained when the pH is between 6.4 and 6.8

It is generally desirable, when the amount of starch is at or near the upper limit specified and the amount of total plasticizer is at or near the lower limit specified, that the ratio of starch gelatinization promoting plasticizer to the starch gelatinizing inhibiting plasticizer be at a maximum, i. e., close to about 1:1.

When, on the other hand, the amount of starch in the composition is near the lower limit of 20% by weight, it is preferred to keep the ratio of starch gelatinization promoting plasticizer to starch gelatinization inhibiting plasticizer at a minimum, i. e., about 1:4 and to include in the starch gelatinization inhibiting plasticizer an amount of high solubility dextrin sufficient to raise the combined amount of starch and dextrin to at least about 40% by weight.

A liquid adhesive is prepared by forming a 50 to 85% solids aqueous dispersion of the potentially adhesive dry blend, raising the temperature of the dispersion to be between about 150 and 175° F., preferably of the order of about 160° F., and maintaining it within that temperature range for about thirty minutes. If desired, a less heavy product will be obtained if a portion of the water is not added until the cook has cooled to about 110° to 125° F. It is to be understood, of course, that if a gelatinization promoting agent is used in a proportion at or near the maximum amount or if the time of cooking is more extended, the temperature of the cook may be as low as about 1100° F.

The pH of the composition is an important factor. If it is permitted to go too low, it will result in a sufficient inversion of any sugar in the plasticizer and will, therefore, bring about staining of the envelope seams. If, on the other hand, the pH is allowed to go too high, staining will result due to an alkali labile effect. If it is known, as it rarely is, that a given adhesive will be utilized within a relatively short time of its manufacture and that envelopes prepared therewith will be sold and used also within a relatively short time, it is possible to allow the pH to go as low as 3.5 and as high as 9.7 because, under such conditions, staining of the envelope seams or discoloration of the adhesive prior to use will not be noticeable to an appreciable extent within a relatively short time. However, it frequently happens in the trade that an envelope seam gum may not be used until a considerable time has elapsed since its manufacture and that, furthermore, envelopes made therewith may not be used for several years after their manufacture. Consequently, it is an essential requirement that an envelope seam gum has long lasting stability against discoloration and staining. It has been found, by accelerated tests well recognized in the trade, that if the pH be maintained between 4.5 and 8.5, preferably between about 5.7 and 7.8, such stability will result. It has further been found that the inclusion in the formula of from 0.5 to 3.0 parts by weight, based on 100 parts by weight of the dry components, of a buffering system will operate to maintain the pH substantially constant throughout the life of the gum by counteracting any acid and alkali formed. Such buffering systems include monosodium phosphate and disodium phosphate, boric acid, citric acid and the like. Monosodium phosphate and disodium phosphate are preferred because they yield a lighter color in the final product.

Inasmuch as it is preferable that the envelope seam gum be white or substantially colorless, it is preferred that minor amounts of a bleaching agent be included in the formula. The bleaching agents are those well known in the art such as, for example, sodium bisulfite.

It is also desirable, but by no means necessary, to include in the composition minor proportions of a foam preventing agent such as, for example, tributyl phosphate.

The invention will be further described in the following examples. It is to be understood that the scope of the invention is not to be limited by these examples and that the examples are included solely for the purpose of illustrating several of the many modifications of the invention.

*Example 1*

48.75 parts by weight of a thin oxidized starch produced by treating an aqueous corn starch suspension with a hypochlorite solution, in the manner previously described, to have a solubility, in distilled water at 25° C., of from 3–5% by weight and such a viscosity that 26–28 grams thereof in 100 cc. of water at 85° C. will flow through an orifice in a standard pipette in 35 to 40 seconds, were placed in a dry state into a blender. A buffer system consisting of 0.73 part by weight of monosodium phosphate and 1.20 parts by weight of disodium phosphate were then added. Following this, 0.33 part by weight of sodium bisulfite, 32.46 parts by weight of sucrose and 16.25 parts by weight of urea were added consecutively in the order named. Finally, 0.28 part by weight of tributyl phosphate were sprayed into the blender. The materials were blended for a period of from 15 to 20 minutes at room temperature.

A 55 gram sample of the dry blend thus obtained was added to 100 cc. of water and heated to 85° C. It was found that at this temperature, the liquid gum thus produced had a pH of 6.4 to 6.8 and had a flow time of 35–40 seconds through an orifice in a standard pipette.

A further portion of the dry blend was stored for several months at room temperature and found to have excellent stability.

213 lbs. of the dry blend were cooked up to a temperature between 158° and 162° F. with 56 lbs. of water. It took approximately 45 minutes to attain the designated temperature and the cook was held at that temperature for an additional 30 minutes. The cook was then cooled to between 100° and 125° F. whereupon an additional 31 lbs. of water were added.

It was found that the resulting liquid gum had a viscosity of between 5,000 and 10,000 centipoises, that it exhibited no undesirable stringiness or "sugaring" or "cottoning" when used on a wide range rotary type machine for applying the gum to the seams of envelopes. The liquid gum had excellent adhesion which was not diminished appreciably even after standing for several months, and did not become discolored.

The liquid gum thus obtained was subjected to an accelerated aging test recognized by the industry as being the equivalent of a one year aging of envelopes stored in a hot climate such as that of Florida. This test consists of making a ¼" wide smear of the liquid gum composition on a paper to be adhered and in an amount sufficient to be visually recognizable. A piece of the same paper is then laminated onto the smear and a large number of such laminated papers are placed in a tin box, the number of such papers and the size of the box being selected so that the pressure exerted on the laminated papers is the substantial equivalent of the pressures to which envelopes are ordinarily subjected when packaged. The box is made air tight and subjected to a temperature of 60° C. (±2° C.) for a period of 48 hours in a thermostatically controlled oven. Immediately thereafter the box is opened and the papers are examined for adhesion and staining. The examination for staining may be done either by transmitted or by reflected light, the examination by transmitted light being the more rigorous because it is more indicative of the amount of staining that would normally result after more than a year.

The results of the test made with the gum prepared in accordance with this example revealed that the gum possessed excellent wet stability, very good machining properties such as non-throwing characteristics, adhesion and no perceptible staining properties.

Example 2

74.73 parts by weight of the dry blend, prepared in accordance with the procedure described in Example 1, were cooked with 19.54 parts by weight of water and cooled, likewise in the manner described in Example 1. 5.73 parts by weight of water were added to the liquid after cooling.

It was found that the resulting liquid gum had a viscosity estimated at between 10,000 and 20,000 centipoises. It had excellent wet tack, stability and was entirely suitable for use with a rotary plunger type machine for applying gum to envelope seams.

The accelerated aging was carried out with this liquid gum and the results were found to be substantially the same as described in Example 1.

Example 3

80 parts by weight of the dry blend prepared in accordance with the procedure described in Example 1 and 20 parts by weight of water were cooked in the manner likewise as described in Example 1. No additional water was added after cooling.

It was found that the liquid gum thus obtained had good fluidity, wet tack and stability, that its viscosity was estimated at as being 50,000 to 70,000 centiposes and that it was entirely satisfactory for use with a plunger type machine for applying gum to the seams of envelopes.

An accelerated aging test performed with the liquid gum of this example was conducted in the manner described in Example 1 and the results were found to be substantially the same.

Example 4

48.88 parts by weight of the oxidized starch described in Example 1 and 8.12 parts by weight of white tapioca dextrin having a solubility in water of 95% or more were put into a blender in the dry state. 1.51 parts by weight of monosodium phosphate and 0.7 part by weight of disodium phosphate were then added. This addition was followed by 20.21 parts by weight of sugar, 20.25 parts by weight of urea, these ingredients being added consecutively in the order named. The materials were then blended for 15 to 20 minutes at room temperature and subjected to the various tests described in Examples 1–3, inclusive.

Example 5

22.3 parts by weight of a thin boiled modified corn starch having a solubility in distilled water at 25° C. of 5–10% and 38.0 parts by weight of white Amioca dextrin having a solubility of 80% were placed in the dry state into a blender. 0.2 part by weight of monosodium phosphate and 0.3 part by weight of disodium phosphate were then added. After this addition, 0.33 part of sodium bisulfite, 28.6 parts by weight of urea and 10.0 parts by weight of sugar were added, these materials being added consecutively in the order named. Finally, 0.28 part by weight of tributyl phosphate were sprayed into the blender.

The materials in the blender were blended for 15 to 20 minutes at room temperature and the resulting dry blend was subjected to the various tests described in Examples 1–3, inclusive.

Example 6

The procedure of Example 1 was repeated, 32.46 parts by weight of sodium acetate and 15.18 parts by weight of calcium nitrate being substituted, however, for the sucrose and urea, respectively, and 0.5 part by weight of monosodium phosphate and 2.5 parts by weight of disodium phosphate being used.

The dry blend thus prepared was found to have excellent stability and liquid gums prepared from this blend were found to have properties substantially similar to those of the liquid gums obtained in Example 1.

Example 7

To 48.75 parts by weight of the oxidized starch described in Example 1 there were added, consecutively in the order named, a buffer system consisting of 0.73 part by weight of monosodium phosphate and 1.20 parts by weight of disodium phosphate; 0.33 part by weight of sodium bisulfite, 11.25 parts by weight of urea, and 5.0 parts by weight of sodium chloride. 0.28 part by weight of tributyl phosphate were then sprayed onto dry ingredients and the whole mass blended for from 15 to 20 minutes.

67.54 lbs. of the dry blend were added to 18.67 lbs. of water. 32.46 lbs. of sorbitol were added to the dispersion. This was then cooked up to a temperature between 158° and 162° F. and held at that temperature for approximately 30 minutes. An additional 10.33 lbs. of water were added to the hot cook at the end of the 30 minute period.

The liquid gum thus obtained was subjected to the accelerated aging test described in Example 1 and found to be entirely satisfactory.

It is to be understood, of course, that numerous changes and modifications will immediately occur to those skilled in the art upon reading the present description. All such changes and modifications are intended to be included within the scope of this invention as defined in the accompanying claims.

I claim:
1. A dry blend consisting of about 48.75 parts by weight of a modified starch which has a water-solubles content of from about 3 to 5% and gives a 25 to 27 gram dispersion in 100 cc. of water having a 50 cc. standard pipette viscosity in the range of 35 to 40 seconds when heated to 85° C., about 16.25 parts by weight of urea, about 32.46 parts by weight of sucrose, about 0.73 part by weight of monosodium phosphate, about 1.2 parts by weight of disodium phosphate, about 0.33 part by weight of sodium bisulfite, and about 0.28 part by weight of tributyl phosphate.

2. A dry blend comprising, as the essential components thereof, from about 40 to about 65 parts by weight of a modified starch which has a water-solubles content in the range of about 0 to 30% and gives a 15 to 35 gram dispersion in 100 cc. of water having a 50 cc. standard pipette viscosity in the range of 35 to 40 seconds when heated to 85° C., from about 10 to about 22 parts by weight of urea, from about 22 to about 40 parts by weight of a non-reducing sugar, and from about 0.5 to 3.0 parts by weight of a buffering system consisting of monosodium phosphate and disodium phosphate.

3. A dry blend comprising, as the essential components thereof, from about 20 to about 65 parts by weight of a modified starch which has a water-solubles content in the range of about 0 to 30% and gives a 15 to 35 gram dispersion in 100 cc. of water having a 50 cc. standard pipette viscosity in the range of 35 to 40 seconds when heated to 85° C., and about 80 to about 35 parts by weight of a starch gelatinization promoter and a starch gelatinization inhibiter selected from the group consisting of non-reducing sugars, alkane polyols having from 2 to 6 carbon atoms, and high soluble dextrins having a solubility of at least 70%, the ratio, by weight, of said promoter and inhibitor to one another being between about 1:1 and 1:4.

4. A method of preparing a dry blend of a potential adhesive which comprises adding to about 48.75 parts by weight of a modified starch which has a water-solubles content of from about 3 to 5% and gives a 25 to 27 gram dispersion in 100 cc. of water having a 50 cc. standard pipette viscosity in the range of 35 to 40 seconds when heated to 85° C., a buffer system consisting of about 0.73 part by weight of monosodium phosphate and about 1.2 parts by weight of disodium phosphate, successively adding about 0.33 part by weight of sodium bisulfite, about 32.46 parts by weight of sucrose, and about 16.25 parts by weight of urea to the dry mixture, spraying about 0.28 part by weight of tributyl phosphate onto the dry mixture, and mixing said components for about 15 to 20 minutes at room temperature, said blend being characterized, upon heating a 55 gram solids dispersion thereof in 100 cc. of water to 85° C., by having a standard pipette viscosity of 35 to 40 seconds and a pH between about 6.4 and about 6.8.

5. A method of preparing a dry blend of a potential adhesive which comprises adding to from about 40 to 65 parts by weight of a modified starch which has a water-solubles content in the range of about 0 to 30% and gives a 15 to 35 gram dispersion in 100 cc. of water having a 50 cc. standard pipette viscosity in the range of 35 to 40 seconds when heated to 85° C., from about 0.5 to 3.0 parts by weight of a buffering system consisting of monosodium phosphate and disodium phosphate, successively adding from about 22 to about 40 parts by weight of a non-reducing sugar and from about 10 to about 22 parts by weight of urea to the dry mixture, and mixing said components for about 15 to 20 minutes at room temperature, said blend being characterized, upon heating a 55 gram solids dispersion thereof in 100 cc. of water to 85° C., by having a standard pipette viscosity of 35 to 40 seconds and a pH between about 5.7 and about 7.8

6. A method of preparing a dry blend of a potential adhesive which comprises adding to from about 20 to 65 parts by weight of a modified starch which has a water-solubles content in the range of about 0 to 30% and gives a 15 to 35 gram dispersion in 100 cc. of water having a 50 cc. standard pipette viscosity in the range of 35 to 40 seconds when heated to 85° C., about 80 to about 35 parts by weight of a starch gelatinization promoter and a starch gelatinization inhibiter selected from the group consisting of non-reducing sugars, alkane polyols having from 2 to 6 carbon atoms, and high soluble dextrins having a solubility of at least 70%, the ratio, by weight, of said promoter and inhibitor to one another being between about 1:1 and 1:4, and dry mixing said ingredients.

7. A method of preparing a liquid adhesive which comprises forming a 50 to 85% solids aqueous dispersion of a potentially adhesive dry blend consisting essentially of about 48.75 parts by weight of a modified starch which has a water-solubles content of from about 3 to 5% and gives a 25 to 27 gram dispersion in 100 cc. of water having a 50 cc. standard pipette viscosity in the range of 35 to 40 seconds when heated to 85° C., about 16.25 parts by weight of urea, about 32.46 parts by weight of sucrose, about 0.73 part by weight of monosodium phosphate, about 1.2 parts by weight of disodium phosphate, about 0.33 part by weight of sodium bisulfite, and about 0.28 part by weight of tributyl phosphate, raising the temperature of said dispersion to about 160° F., and maintaining it at about that temperature for about thirty minutes.

8. A method of preparing a liquid adhesive which comprises forming a 50 to 85% solids aqueous dispersion of a potentially adhesive dry blend consisting essentially of about 40 to 65 parts by weight of a modified starch which has a water-solubles content in the range of about 0 to 30% and gives a 15 to 35 gram dispersion in 100 cc. of water having a 50 cc. standard pipette viscosity in the range of 35 to 40 seconds when heated to 85% C., from about 10 to about 22 parts by weight of urea, from about 22 to about 40 parts by weight of a non-reducing sugar and from about 0.5 to 3.0 parts by weight of a buffering system consisting of monosodium phosphate and disodium phosphate, raising the temperature of said dispersion to between about 150° and 175° F., and maintaining it within that temperature range for about thirty minutes.

9. A method of preparing a liquid adhesive which comprises forming a 50 to 85% solids aqueous dipersion of a potentially adhesive dry blend consisting essentially of about 20 to 65 parts by weight of a modified starch which has a water-solubles content in the range of about 0 to 30% and gives a 15 to 35 gram dispersion in 100 cc. of water having a 50 cc. standard pipette viscosity in the range of 35 to 40 seconds when heated to 85° C., and about 80 to about about 35 parts by weight of a starch gelatinization promoter and a starch gelatinization inhibiter selected from the group consisting of non-reducing sugars, alkane polyols having from 2 to 6 carbon atoms, and high soluble dextrins having a solubility of at least 70%, the ratio, by weight, of said promoter and inhibiter to one another being between about 1:1 and 1:4, raising the temperature of said dispersion to between about 150° and 175° F., and maintaining it within that temperature range for about thirty minutes.

10. An adhesive paste comprising a cooked 50 to 85% solids aqueous dispersion consisting essentially of about 48.75 parts by weight of a modified starch initially having a water-solubles content of from about 3 to 5% and giving a 25 to 27 gram dispersion in 100 cc. of water having a 50 cc. standard pipette viscosity in the range of 35 to 40 seconds when heated to 85° C., about 16.25 parts by weight of urea, about 32.46 parts by weight of sucrose, about 0.73 part by weight of monosodium phosphate, about 1.2 parts by weight of disodium phosphate, about 0.33 part by weight of sodium bisulfite, and about 0.28 part by weight of tributyl phosphate.

11. An adhesive paste comprising a cooked 50 to 85% solids aqueous dispersion consisting essentially of about 40 to 65 parts by weight of a modified starch initially having a water-solubles content in the range of about 0 to 30% and giving a 15 to 30 gram dispersion in 100 cc. of water having a 50 cc. standard pipette viscosity in the range of 35 to 40 seconds when heated to 85° C., from about 10 to about 22 parts by weight of urea, from about 22 to about 40 parts by weight of a non-reducing sugar and from about 0.5 to 3.0 parts by weight of a buffering system consisting of monosodium phosphate and disodium phosphate.

12. An adhesive paste comprising a cooked 50 to 85% solids aqueous dispersion consisting essentially of about 20 to 65 parts by weight of a modified starch initially having a water-solubles content in the range of about 0 to 30% and giving a 15 to 35 gram dispersion in 100 cc. of water having a 50 cc. standard pipette viscosity in the range of 35 to 40 seconds when heated to 85° C., and about 80 to about 35 parts by weight of a starch gelatinization promoter and a starch gelatinization inhibiter selected from the group consisting of non-reducing sugars, alkane polyols having from two to six carbon atoms and high soluble dextrines having a solubility of at least 70%, the ratio, by weight, of said promoter and inhibiter to one another being between about 1:1 and 1:4.

JULIUS RAPP.

REFERENCES CITED

The following references are of record in the file of this patent:

UNITED STATES PATENTS

| Number | Name | Date |
| --- | --- | --- |
| 214,910 | Hegi | Apr. 29, 1879 |
| 1,268,672 | Bloede | June 4, 1918 |
| 1,501,911 | Mathias | July 22, 1924 |
| 1,989,150 | Pierson | Jan. 29, 1935 |
| 2,023,973 | Pierson | Dec. 10, 1935 |
| 2,215,849 | Bauer | Sept. 24, 1940 |
| 2,238,767 | Bauer | Apr. 15, 1941 |
| 2,317,752 | Fuller | Apr. 27, 1943 |
| 2,338,457 | Rozenbrock | Jan. 4, 1944 |

FOREIGN PATENTS

| Number | Country | Date |
| --- | --- | --- |
| 420,749 | Germany | Oct. 30, 1925 |
| 490,070 | Great Britain | Aug. 9, 1938 |

OTHER REFERENCES

Simonds et al.: Handbook of Plastics (1943), pages 268 and 269.